(12) United States Patent
Devereux

(10) Patent No.: US 6,941,442 B2
(45) Date of Patent: Sep. 6, 2005

(54) ENTRY LOCKDOWN WITHIN A TRANSLATION LOOKASIDE BUFFER MECHANISM

(75) Inventor: Ian Victor Devereux, Cambridge (GB)

(73) Assignee: ARM Limited, Cambridge (GB)

( * ) Notice: Subject to any disclaimer, the term of this patent is extended or adjusted under 35 U.S.C. 154(b) by 112 days.

(21) Appl. No.: 10/210,060

(22) Filed: Aug. 2, 2002

(65) Prior Publication Data

US 2004/0024986 A1 Feb. 5, 2004

(51) Int. Cl.[7] .............................................. G06F 12/00
(52) U.S. Cl. ...................................... 711/207; 711/159
(58) Field of Search ................................ 711/133, 136, 711/159, 160, 202, 205, 206, 207

(56) References Cited

U.S. PATENT DOCUMENTS

| | | | | |
|---|---|---|---|---|
| 6,138,225 A | * | 10/2000 | Upton et al. ................ | 711/207 |
| 6,223,263 B1 | * | 4/2001 | Mathews et al. ........... | 711/163 |
| 6,374,341 B1 | * | 4/2002 | Nijhawan et al. .......... | 711/207 |
| 6,553,477 B1 | * | 4/2003 | Krishna et al. ............. | 711/207 |
| 6,625,715 B1 | * | 9/2003 | Mathews ..................... | 711/207 |

* cited by examiner

Primary Examiner—Matthew D. Anderson
Assistant Examiner—Shane Thomas
(74) Attorney, Agent, or Firm—Nixon & Vanderhye P.C.

(57) ABSTRACT

A translation lookaside buffer mechanism is described incorporating a set associative translation lookaside buffer operating in parallel with a fully associative translation lookaside buffer. Lockdown entries are stored within the fully associative translation lookaside buffer and non-lockdown entries are stored within the set associative translation lookaside buffer. Victim selection for the fully associative translation lookaside buffer 18 is performed using a control register within a coprocessor which is set under operating system software control.

24 Claims, 3 Drawing Sheets

ENTRY LOCKDOWN WITHIN A TRANSLATION LOOKASIDE BUFFER MECHANISM

BACKGROUND

This invention relates to the field of data processing systems. More particularly, this invention relates to data processing systems including a translation lookaside buffer mechanism having provision for the lockdown of entries within that translation lookaside buffer mechanism.

Translation lookaside buffers serve to map virtual addresses to physical addresses, as well as other functions, within a data processing system. One type of translation lookaside buffer is fully associative and uses a content addressable memory to store TAG values for each entry such that an input TAG value may be compared in parallel with all of the entries within the content addressable memory to find any match. If a match occurs, then the corresponding data entry, such as a virtual address, or a portion of a virtual address, may be read out from the data memory associated with the content addressable memory. Another known type of translation lookaside buffer is a set associative translation lookaside buffer in which a portion of the data value being looked up is used to select amongst a plurality of TAG RAMs with a different portion of the data value being used to index a particular entry within that TAG RAM before a comparison is made with the corresponding TAG data stored in the identified entry to check for a match. If such a match occurs, then a data value within a data RAM associated with the selected TAG RAM may be read out.

Lockdown mechanisms are provided for entries within translation lookaside buffers. Lockdown may be used such that once an entry has been placed into the translation lookaside buffer it will not be removed during normal processing operation and accordingly a guaranteed fast lookup of the translation required may be assured. Lockdown entries are particularly useful for handling translations associated with performance critical operations such as interrupt handling, abort or exception handlers and frequently used performance critical program code or data.

Fully associative translation lookaside buffers have the advantage that they provide a flexible environment in which entry lockdown can be supported in that a given new entry can be stored at any position within the content addressable memory and accordingly if a portion of the content addressable memory is locked down, then this does not unduly restrict the options for storing non-lockdown entries. However, a problem with content addressable memories is that in the increasingly common situation of synthesised designs, content addressable memories tend to have a disadvantageously large circuit area and power consumption requirement as well as being relatively slow.

Set associative translation lookaside buffers have the advantage that they are well suited for synthesised design since the circuit elements, largely RAM arrays, from which they are formed are readily provided within the cell libraries of circuit synthesis systems. Synthesised set associative translation lookaside buffers tend to be relatively small, power efficient and fast compared to large synthesised content addressable memories. However, a problem associated with set associative translation lookaside buffers is that a given entry has a finite, and often relatively small, number of positions within which it may potentially be stored within the set associative translation lookaside buffer. If one or more of these potential locations is locked down, then this can severely restrict the possibilities for storing a desired entry within the translation lookaside buffer and can significantly degrade performance. It is possible that in some situations all the potential storage locations for a new entry might already be occupied by locked down entries and accordingly storage of that entry within the translation lookaside buffer would not be possible at all. It is also possible that all of the alternative storage locations for an entry which it is desired to lock down within the set associative translation lookaside buffer might already be occupied by locked down entries and accordingly a highly performance critical entry may not be accommodated within the set associative translation lookaside buffer.

SUMMARY

Viewed from one aspect the present invention provides a translation lookaside buffer mechanism comprising:

a set associative translation lookaside buffer;

a fully associative translation lookaside buffer operable in combination with said set associative translation lookaside buffer; and a lock down mechanism operable to lock down entries within said fully associative translation lookaside buffer.

The invention recognises that by the provision of a translation lookaside buffer mechanism that includes both a set associative translation lookaside buffer and a fully associative translation lookaside buffer operating in combination with the set associative lookaside buffer, advantages associated with both of the different types of translation lookaside buffer may be substantially realised whilst the disadvantages associated with respective types of translation lookaside buffer may be substantially avoided. In particular, lockdown entries may be made within the fully associative translation lookaside buffer as this is well suited to such use and provides a flexible and efficient way of providing lockdown. At the same time, the set associative translation lookaside buffer can provide area, power and speed efficiency gains for the mechanism as a whole relative to the total number of entries being stored. This combined system recognises that in practice only relatively few entries need to be locked down within the translation lookaside buffer mechanism and accordingly a relatively small fully associative translation lookaside buffer may be provided for this purpose with the bulk of the translation lookaside buffer mechanism storage being provided by the efficient to implement and use set associative translation lookaside buffer.

It will be appreciated that whilst the set associative translation lookaside buffer and the fully associative translation lookaside buffer operate in combination, this may be achieved in a variety of different ways. It would be possible for the two types of translation lookaside buffer to operate in sequence, but in preferred embodiments the overall speed of operation is improved when both types of translation lookaside buffer operate in parallel.

Whilst it will be understood that it will be possible for the set associative lookaside buffer to have lockable entries in addition to the fully associative lookaside buffer, it will be appreciated that this will not generally be necessary and accordingly in preferred embodiments the set associative lookaside buffer does not have lockable entries.

Whilst the relative size of the two types of translation lookaside buffer could vary depending upon the particular requirements of the situation in which the lookaside buffer mechanism is employed, it will generally be preferred that the fully associative translation lookaside buffer has fewer entries than the set associate translation lookaside buffer.

The roles being performed by the two different translation lookaside buffers are not the same and accordingly it is preferred to have separate victim selection mechanisms for the two different types of translation lookaside buffers so that appropriate victim selection algorithm and control can be separately applied to the two situations.

In preferred embodiments the fully associative translation lookaside buffer may be subject to software controlled victim selection, such as by storing victim specifying data within a control register. Software control of victim selection for the relatively small and relatively infrequently changed lockdown entries within the fully associative translation lookaside buffer is convenient to provide flexibly by software mechanisms and yet this introduces relatively little overall performance impact when being set up since the lockdown entries are generally not often changed and are already in place when required for high speed use.

The storage of new entries within the translation lookaside buffer mechanism may be controlled in a variety of different ways, but in preferred embodiments the implementation is simplified when new entries are made by default in the set associative translation lookaside buffer unless particularly selected for lockdown within the full associative translation lookaside buffer.

If it was desired to make use of the fully associative translation lookaside buffer for storage of non-lockdown entries, then it is possible for an appropriate victim selection algorithm to be used that would encompass both the fully associative translation lookaside buffer and the set associative translation lookaside buffer.

The circuit level implementation of the full associative translation lookaside buffer and the set associative translation lookaside buffer can vary depending upon the circumstances, but the invention is particularly well suited to situations in which the fully associative translation lookaside buffer includes a content addressable memory storing TAG values and/or the set associative translation lookaside buffer includes a RAM memory storing TAG values.

Viewed from another aspect the present invention also provides a method of performing lookaside translation comprising the steps of:

performing a lookup within a set associative translation lookaside buffer; and performing a lookup within a fully associative translation lookaside buffer operable; wherein one or more entries within said fully associative translation lookaside buffer are locked down entries.

The above, and other objects, features and advantages of this invention will be apparent from the following detailed description of illustrative embodiments which is to be read in connection with the accompanying drawings.

DESCRIPTION

Figure 1:
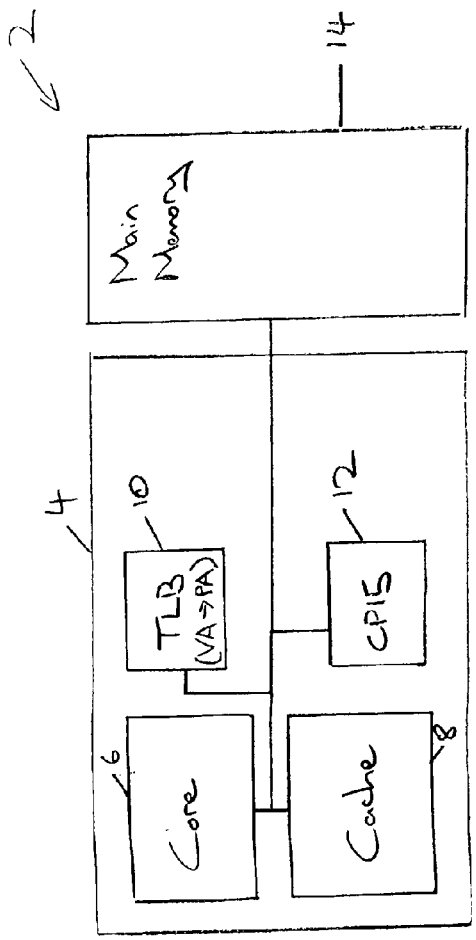
FIG. 1 schematically illustrates a data processing system incorporating a translation lookaside buffer mechanism.

FIG. 1 schematically illustrates a data processing system 2 including an integrated circuit 4 having a microprocessor core 6, a cache memory 8, a translation lookaside buffer mechanism 10 and a coprocessor 12. The integrated circuit 4 is coupled to a main memory integrated circuit 14.

It will be appreciated that the data processing system 2 of FIG. 1 is represented highly schematically and many further circuit elements may be present. In operation the microprocessor core 6 executes some program instructions which involve as part of their execution a requirement to convert a virtual address VA and a physical address PA. This conversion is performed by the translation lookaside buffer mechanism 10. Data values being accessed may be stored within the cache memory 8 or the main memory 14. A coprocessor 12 is provided which includes one or more control registers to which control values may be written to configure the operation of the integrated circuit 4.

Figure 2:
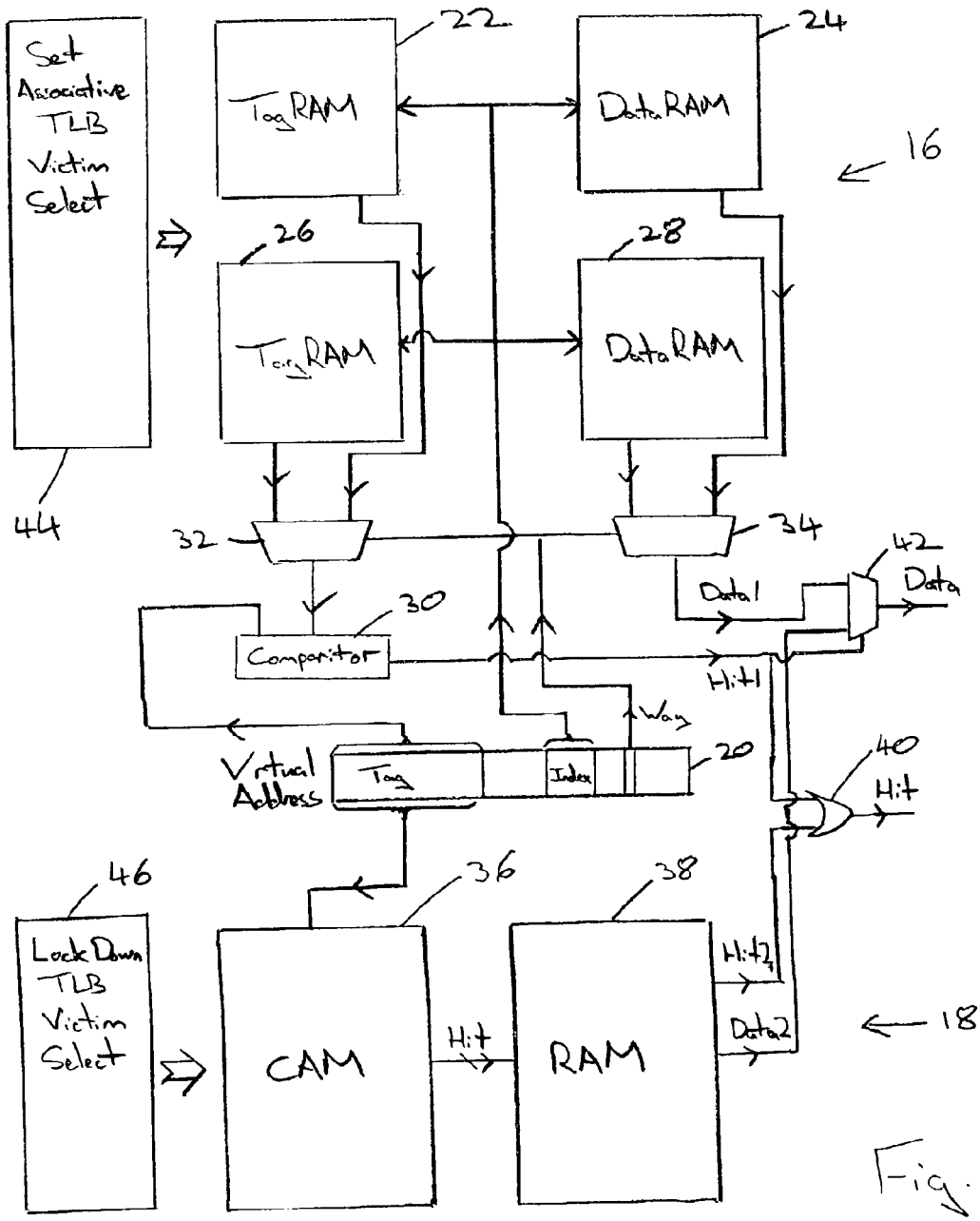
FIG. 2 schematically illustrates a translation lookaside buffer mechanism incorporating both a set associative translation lookaside buffer and a fully associative translation lookaside buffer.

FIG. 2 illustrates the translation lookaside buffer mechanism 10 in more detail. At an overall level this consists of a combination of a set associative translation lookaside buffer 16 and a fully associative translation lookaside buffer 18. The set associative translation lookaside buffer 16 is two-way set associative in that for a given virtual address VA 20 being provided with an entry, there are two possible positions within the set associative lookaside buffer where this may be stored. More particularly, a bit within the virtual address 20 specifies the way in which a translation to a physical address will be found if it is stored. In this embodiment, one way is formed of the TAG RAM 22 and the data RAM 24, and the other way is formed of the TAG RAM 26 and the data RAM 28. With the way determined, another field of bits within the virtual address 20 selects an index position within the respective TAG RAM 22, 26 where a TAG value which may potentially match the virtual address TAG value will be stored. This TAG value is driven out to a comparator 30 via a multiplexer 32 where a comparison is made with the corresponding TAG bits within the virtual address 20. If a match is found, then a hit signal is generated for the set associative translation lookaside buffer.

At the same time that the TAG value lookup and comparison is occurring, the selected data entry from within the data RAMS 24 and 28 is selected by the way signal and the index signal and is output via a multiplexer 34.

At the same time as the lookup is occurring within the set associative translation lookaside buffer 16, a lookup is also occurring within the fully associative translation lookaside buffer 18. The fully associative translation lookaside buffer 18 includes a content addressable memory 36 and a random access memory 38. The TAG value from the virtual address 20 is compared in parallel with all of the TAG values stored within the content addressable memory 36 and if a hit is found, then a hit signal for the corresponding entry within the fully associative translation lookaside buffer is passed to the random access memory 38 and a data value read out from the entry that has generated the hit.

An OR gate 40 serves to pass either the hit signal from the set associative translation lookaside buffer 16 or the hit signal from the fully associative translation lookaside buffer 18 out to the rest of the circuitry. A multiplexer 42 controlled by the hit signal from the set associative translation lookaside buffer is used to select either the data output from the multiplexer 34 which was stored within the set associative translation lookaside buffer 16 or the data output from the random access memory 38 which was stored within the fully associative translation lookaside buffer 18.

In operation, hits do not occur simultaneously in both the set associative translation lookaside buffer 16 and the fully associative translation lookaside buffer 18 since entries are not written into the translation lookaside buffer mechanism 10 unless a miss has occurred and when such entries are written into the translation lookaside buffer mechanism 10 these are positively selected to be written as lockdown entries into the fully associative translation lookaside buffer 18 or alternatively as non-lockdown entries into the set associative translation lookaside buffer 16.

As illustrated in FIG. 2, the set associative translation lookaside buffer 16 has a victim select unit 44 and the fully associative translation lookaside buffer 18 has a separate victim select unit 46. The victim selection strategies and the nature of the victim selection control applied to the different portions of the translation lookaside buffer mechanism 10 are such that separate victim select units 44, 46 are appropriate.

The victim select unit 44 for the set associative translation lookaside buffer 16 may use one of a variety of known different victim selection algorithms. This victim selection unit 44 will be utilised when an entry is to be written to the translation lookaside buffer mechanism 10 following a miss and where this entry is not specified as being a lockdown entry, i.e. the entries are by default written to the set associative translation lookaside buffer 16 when not positively selected for lockdown. Whilst this is the arrangement in the embodiment of FIG. 2, it will be appreciated that non-lockdown entries could in alternative embodiments be made in available positions in either the set associative translation lookaside buffer 16 or the fully associative translation lookaside buffer 18.

Figure 3:
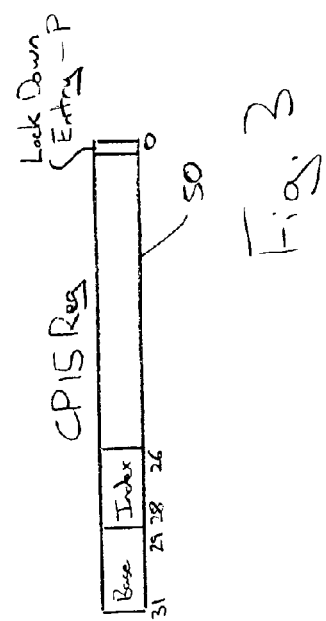
FIG. 3 schematically illustrates the use of a control register to direct victim selection for lockdown entries within the fully associative translation lookaside buffer.

The victim select unit 46 associated with the fully associative translation lookaside buffer 18 is under software control as will be described in relation to FIG. 3. FIG. 3 illustrates a control register 50 located within the coprocessor 12. This control register 50 may be accessed by system software (e.g. operating system software) executing on the microprocessor core 16 which has appropriate privileges to access such control registers. The control register 50 incorporates at bit position 0 a flag P which indicates that the next miss to occur in the translation lookaside buffer mechanism 10 should result in a Protected (i.e. locked down) entry being stored into the fully associative translation lookaside buffer 18. A bitfield Index specifies which of eight entries within the fully associative translation lookaside buffer 18 is to be used as the victim when the miss occurs. A Base field may be read by the software to specify which of the eight entries within the fully associative translation lookaside buffer 18 are not already locked down, e.g. in this embodiment with eight entries. The value stored in the Base field may specify a value between 0 and 7 for entries upwards from and including those which are not currently storing locked down entries and accordingly may be used as a victim for the next lockdown entry to be made.

FIG. 3 also shows a sequence of the relevant field values from within the control register 50 which may occur. In the first row, both the base field and the index field are zero and the P flag indicates that the next translation lookaside buffer miss need not result in a locked down entry being stored. The second row shows that the operating system has set the P flag to True indicating that when a translation lookaside buffer miss occurs, then the storage of an entry that follows will be a lockdown storage. The index value of zero at this point specifies that the zeroth entry within the fully associative translation lookaside buffer 18 will be selected. Once this miss has occurred, the P flag can be reset, either under software control or by hardware, and the Base value changed, either by a hardware incrementor or by software control, to indicate that the available storage locations within the fully associative translation lookaside buffer 18 now extend from entry 1 to entry 7. At this point, the value within the Index field does not matter.

In the fourth row illustrated, it is desired to make another lockdown entry and accordingly, the P flag is set to True and the index field is set to a value of 1 as this is the next storage location available. In the final row, the Base value has been incremented to 2 and the P flag has been reset to False.

Figure 4:
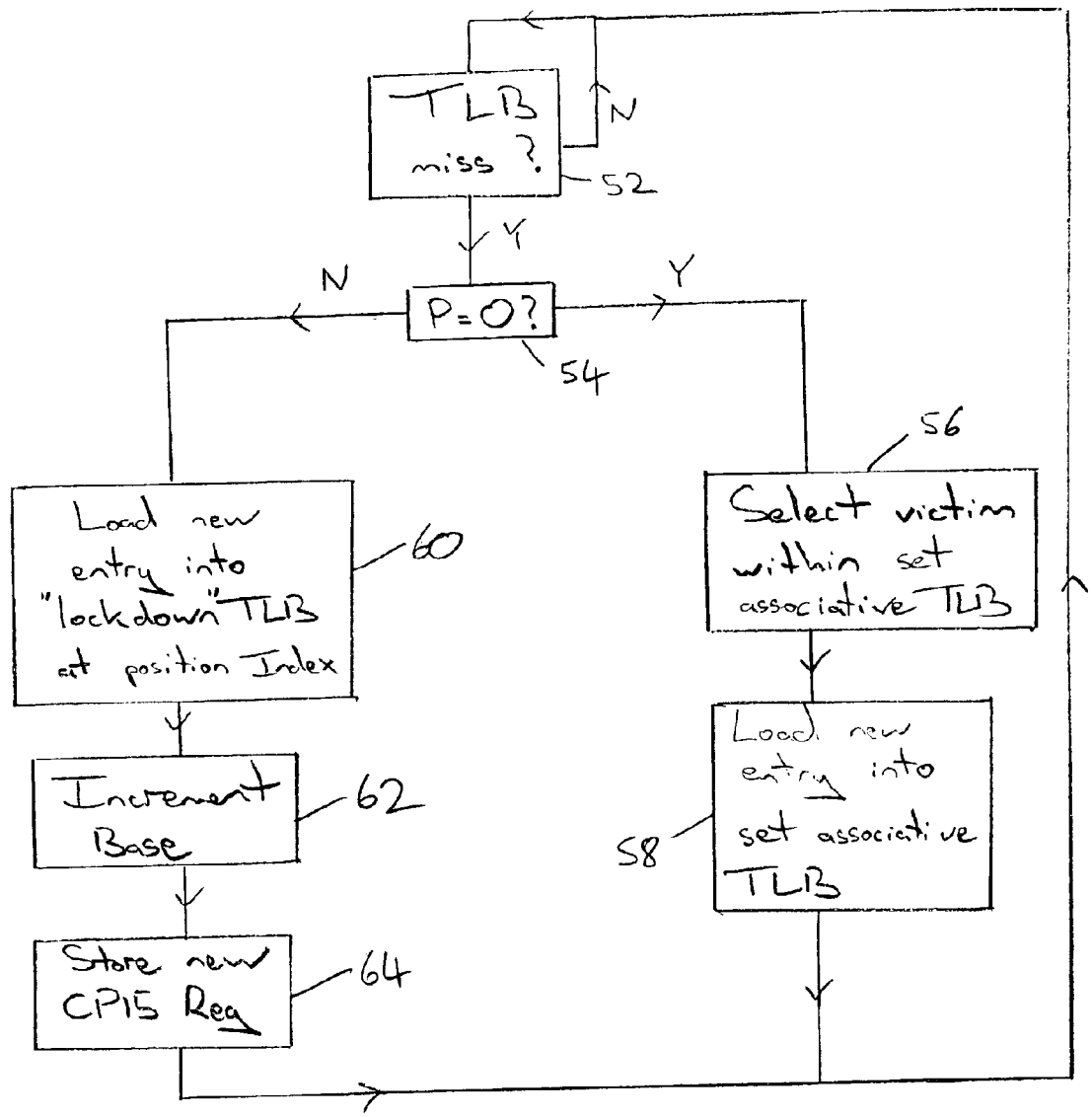
FIG. 4 is a flow diagram schematically illustrating the process of victim selection which occurs on a translation lookaside buffer miss for the translation lookaside buffer mechanism as a whole.

FIG. 4 schematically illustrates the processing operations that occur when a translation lookaside buffer miss occurs. It will be appreciated that these operations are illustrated in the form of a flow diagram which implies sequential operation, but in practice these operations may occur in a different order. At step 52 the process waits for a translation lookaside buffer miss to occur. When such a miss occurs, processing proceeds to step 54 at which the P flag within the control register 50 is tested to see whether this is a 0 indicating that the miss should not result in a lockdown store or a 1 indicating that the miss should result in a lockdown store.

If a lockdown store is not required, then processing proceeds to step 56 at which the victim select unit 44 selects an entry within the set associative translation lookaside buffer 16 which is to be used to store the new value resulting from the miss. At step 58 the new entry is loaded into the selected position within the set associative translation lookaside buffer 16.

If at step 54 a determination was made that a lockdown entry was required, then processing proceeds to step 60. Step 60 reads the control register 50, and in particular the Index value which has been set up by the operating system software executing on the microprocessor core 6. This Index value specifies the position within the fully associative content addressable memory where the new entry is to be made. In one particular example embodiment of FIG. 2, the fully associative translation lookaside buffer 18 has 8 entries and the set associative translation lookaside buffer 16 has 512 entries. In the example illustrated in FIG. 2 the set associative translation lookaside buffer is 2-way set associative (for simplicity of illustration), but it would also be possible for this to be 4-way or 8-way or more generally N-way should circumstances and other design requirements so direct.

Following storage of the new locked down entry within the fully associative translation lookaside buffer 18, processing proceeds to step 62 at which the Base field within the control register 50 is incremented in value with the new entry for the control register 50 being written back to the coprocessor 12 at step 64.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A translation lookaside buffer mechanism comprising:
   a set associative translation lookaside buffer;
   a fully associative translation lookaside buffer operable in combination with said set associative translation lookaside buffer;
   a lock down mechanism operable to lock down entries within said fully associative translation lookaside buffer; and wherein said fully associative translation lookaside buffer has software-controlled victim selection, and wherein victim selection for said fully associative translation lookaside buffer is made based on victim specifying data stored in a coprocessor control register.

2. A translation lookaside buffer mechanism as claimed in claim 1, wherein said fully associative translation lookaside buffer operates in parallel with said set associative translation lookaside buffer.

3. A translation lookaside buffer mechanism as claimed in claim 1, wherein said set associative lookaside buffer does not have lockable entries.

4. A translation lookaside buffer mechanism as claimed in claim 1, wherein said fully associative translation lookaside buffer has fewer entries than said set associative translation lookaside buffer.

5. A translation lookaside buffer mechanism as claimed in claim 1, wherein said fully associative translation lookaside buffer and said set associative translation lookaside buffer have separate victim selection mechanisms.

6. A translation lookaside buffer mechanism as claimed in claim 1, wherein a new entry is by default written to said set associative translation lookaside buffer unless said new entry is selected for lockdown within said fully associative translation lookaside buffer.

7. A translation lookaside buffer mechanism as claimed in claim 1, wherein said fully associative translation lookaside buffer includes a content addressable memory storing TAG values.

8. A translation lookaside buffer mechanism as claimed in claim 1, wherein said set associative translation lookaside buffer includes a RAM memory storing TAG values.

9. A method of performing lookaside translation comprising the steps of:

performing a lookup within a set associative translation lookaside buffer; and performing a lookup within a fully associative translation lookaside buffer operable;

wherein one or more entries within said fully associative translation lookaside buffer are locked down entries, wherein said fully associative translation lookaside buffer operates with software-controlled victim selection; and wherein victim selection for said fully associative translation lookaside buffer includes the step of storing victim specifying data within a coprocessor control register.

10. A method as claimed in claim 9, wherein said lookup within said fully associative translation lookaside buffer is performed in parallel with said lookup with said set associative translation lookaside buffer.

11. A method as claimed in claim 9, wherein said set associative lookaside buffer does not have lockable entries.

12. A method as claimed in claim 9, wherein said fully associative translation lookaside buffer has fewer entries than said set associative translation lookaside buffer.

13. A method as claimed in claim 9, wherein said fully associative translation lookaside buffer and said set associative translation lookaside buffer operate with separate victim selection mechanisms.

14. A method as claimed in claim 9, wherein a new entry is by default written to said set associative translation lookaside buffer unless said new entry is selected for lockdown within said fully associative translation lookaside buffer.

15. A method as claimed in claim 9, wherein said fully associative translation lookaside buffer stores TAG values in a content addressable memory.

16. A method as claimed in claim 9, wherein said set associative translation lookaside buffer stores TAG values in a RAM memory.

17. Apparatus for performing lookaside translation comprising:

means for performing a lookup within a set associative translation lookaside buffer; and means for performing a lookup within a fully associative translation lookaside buffer operable;

means for performing victim selection for said fully associative translation lookaside buffer based on victim specifying data stored in a coprocessor control register;

wherein one or more entries within said fully associative translation lookaside buffer are locked down entries, and wherein said fully associative translation lookaside buffer is configured to operate with software-controlled victim selection.

18. Apparatus as claimed in claim 17, wherein said lookup within said fully associative translation lookaside buffer is configured to be performed in parallel with said lookup with said set associative translation lookaside buffer.

19. Apparatus as claimed in claim 17, wherein said set associative lookaside buffer does not have lockable entries.

20. Apparatus as claimed in claim 17, wherein said fully associative translation lookaside buffer has fewer entries than said set associative translation lookaside buffer.

21. Apparatus as claimed in claim 17, wherein said fully associative translation lookaside buffer and said set associative translation lookaside buffer are configured to operate with separate victim selection mechanisms.

22. Apparatus as claimed in claim 21, further comprising:

means for writing a new entry by default to said associative lookaside buffer unless said new entry is selected for lockdown said fully associative translation lookaside buffer.

23. Apparatus as claimed in claim 21, wherein said fully associative translation lookaside buffer is configured to store TAG values in a content addressable memory.

24. Apparatus as claimed in claim 21, wherein said set associative translation lookaside buffer is configured to store TAG values in a RAM memory.

* * * * *